(12) United States Patent
Irgang et al.

(10) Patent No.: US 10,890,468 B2
(45) Date of Patent: Jan. 12, 2021

(54) LIGHT RING ASSEMBLY AND METHOD OF USING THE SAME

(71) Applicant: Rebo Lighting & Electronics, LLC, Ann Arbor, MI (US)

(72) Inventors: Todd Irgang, Saline, MI (US); Orin Lenz, Canton, MI (US); Chris Casanova, Northville, MI (US)

(73) Assignee: REBO LIGHTING & ELECTRONICS, LLC, Ann Arbor, MI (US)

(*) Notice: Subject to any disclaimer, the term of this patent is extended or adjusted under 35 U.S.C. 154(b) by 444 days.

(21) Appl. No.: 15/887,709

(22) Filed: Feb. 2, 2018

(65) Prior Publication Data

US 2018/0216973 A1    Aug. 2, 2018

Related U.S. Application Data

(60) Provisional application No. 62/453,597, filed on Feb. 2, 2017.

(51) Int. Cl.
*G01D 11/28* (2006.01)
*B60Q 3/14* (2017.01)
(Continued)

(52) U.S. Cl.
CPC .............. *G01D 11/28* (2013.01); *B60L 53/16* (2019.02); *B60Q 1/0052* (2013.01); *B60Q 3/14* (2017.02);
(Continued)

(58) Field of Classification Search
CPC ........ G01D 11/28; B60Q 1/0052; B60Q 3/64; B60Q 3/14; F21S 43/241; F21S 43/249;
(Continued)

(56) References Cited

U.S. PATENT DOCUMENTS 3,699,915 A * 10/1972 Greene .................. G01D 11/28
                                                362/23.15
5,741,058 A *  4/1998 Suzuki .................. B60K 35/00
                                                362/23.16
(Continued)

FOREIGN PATENT DOCUMENTS

CN       103791353 A    5/2014
GB         2435937 A    9/2007

OTHER PUBLICATIONS

International Search Report Issued for PCT/US2018/016711 dated May 15, 2018.
(Continued)

*Primary Examiner* — Nimeshkumar D Patel
*Assistant Examiner* — Tania Courson
(74) *Attorney, Agent, or Firm* — Reising Ethington, P.C.

(57) ABSTRACT

A light ring assembly that is designed to provide bright, uniform and homogenized illumination and that can be used with any number of vehicle and non-vehicle lighting applications. According to one embodiment, the light ring assembly includes a housing, a circuit board with a number of individual light sources, a light ring and a lens. Light emitted by the light sources enters an optical input surface on a bottom side of the light ring, is reflected within the body of the light ring so as to mix and become more distributed, and then exits an optical output surface on a top side of the light ring.

17 Claims, 4 Drawing Sheets

(51) Int. Cl.

| | |
|---|---|
| *F21V 23/00* | (2015.01) |
| *B60Q 1/00* | (2006.01) |
| *F21S 43/241* | (2018.01) |
| *F21S 43/249* | (2018.01) |
| *F21S 43/243* | (2018.01) |
| *B60Q 3/64* | (2017.01) |
| *F21S 43/14* | (2018.01) |
| *B60L 53/16* | (2019.01) |
| *F21Y 115/00* | (2016.01) |
| *F21Y 115/10* | (2016.01) |
| *F21Y 103/33* | (2016.01) |

(52) U.S. Cl.
CPC ............... *B60Q 3/64* (2017.02); *F21S 43/14* (2018.01); *F21S 43/241* (2018.01); *F21S 43/243* (2018.01); *F21S 43/249* (2018.01); *F21V 23/005* (2013.01); *F21V 23/009* (2013.01); *B60K 2370/154* (2019.05); *B60K 2370/698* (2019.05); *F21Y 2103/33* (2016.08); *F21Y 2115/00* (2016.08); *F21Y 2115/10* (2016.08); *Y02T 10/70* (2013.01); *Y02T 10/7072* (2013.01); *Y02T 90/14* (2013.01)

(58) Field of Classification Search
CPC ......... F21S 43/243; F21S 43/14; B60L 53/16; F21V 23/009; F21V 23/005; Y02T 90/14; Y02T 10/7072; Y02T 10/7005; F21Y 2103/33; F21Y 2115/00; F21Y 2115/10; B60K 2370/154; B60K 2370/698
See application file for complete search history.

(56) References Cited

U.S. PATENT DOCUMENTS

| | | | | |
|---|---|---|---|---|
| 6,320,500 | B1 * | 11/2001 | Adelsson | G01D 7/04 340/441 |
| 6,334,688 | B1 * | 1/2002 | Niwa | G05G 1/105 362/23.01 |
| 6,450,656 | B1 * | 9/2002 | Noll | B60Q 3/14 362/23.15 |
| 6,454,437 | B1 * | 9/2002 | Kelly | G01J 3/10 359/287 |
| 6,565,244 | B1 | 5/2003 | Murphy et al. | |
| 6,674,497 | B2 * | 1/2004 | Brandt | G01C 21/265 349/74 |
| 6,718,906 | B2 * | 4/2004 | Quigley | G01P 1/08 116/62.1 |
| 6,817,310 | B2 * | 11/2004 | Sugiyama | G01D 13/04 116/62.4 |
| 7,126,564 | B2 * | 10/2006 | Schach | G01D 11/28 345/75.1 |
| 7,207,117 | B1 * | 4/2007 | Cook | G01D 11/28 116/286 |
| 7,278,749 | B2 * | 10/2007 | Sullivan | G01D 11/28 116/286 |
| 7,347,160 | B2 * | 3/2008 | Honma | B60K 37/02 116/288 |
| 7,404,374 | B2 * | 7/2008 | Kato | G01D 11/28 116/286 |
| 7,549,390 | B2 * | 6/2009 | Verdouw | B60K 37/02 116/288 |
| 7,810,445 | B2 * | 10/2010 | Krishnamurthy | B60K 37/02 116/288 |
| 8,317,376 | B2 * | 11/2012 | Hook | B60Q 1/2661 362/459 |
| 8,826,846 | B2 * | 9/2014 | Hori | G01D 11/28 116/286 |
| 8,943,996 | B2 * | 2/2015 | Box | G01D 11/28 116/288 |
| 9,739,646 | B2 * | 8/2017 | Suess | G01D 11/28 |
| 9,889,793 | B2 * | 2/2018 | Krishna | G01D 11/28 |
| 2002/0061178 | A1 | 5/2002 | Winston | |
| 2005/0146893 | A1 | 7/2005 | Ford et al. | |
| 2006/0243191 | A1 * | 11/2006 | Verdouw | G01D 13/28 116/288 |
| 2007/0236909 | A1 | 10/2007 | Tamura | |
| 2008/0105191 | A1 * | 5/2008 | Kato | G01D 11/28 116/288 |
| 2008/0285256 | A1 * | 11/2008 | Mezouari | G02B 6/001 362/23.13 |
| 2009/0223436 | A1 | 9/2009 | Werman et al. | |
| 2009/0316382 | A1 | 12/2009 | Birman et al. | |
| 2010/0071611 | A1 | 3/2010 | Krishnamurthy | |
| 2010/0246198 | A1 | 9/2010 | Hook | |
| 2013/0027902 | A1 | 1/2013 | Miyazawa et al. | |
| 2014/0165901 | A1 * | 6/2014 | Birman | G01D 13/02 116/62.1 |
| 2014/0340867 | A1 | 11/2014 | Kobayashi et al. | |
| 2015/0092390 | A1 | 4/2015 | Birman et al. | |
| 2015/0103509 | A1 | 4/2015 | Sato et al. | |
| 2015/0266419 | A1 | 9/2015 | Pasotti | |
| 2015/0321600 | A1 | 11/2015 | Webb | |
| 2016/0054505 | A1 | 2/2016 | Scavino et al. | |
| 2016/0200247 | A1 | 7/2016 | Krishna et al. | |
| 2019/0309927 | A1 * | 10/2019 | Irgang | F21V 7/24 |

OTHER PUBLICATIONS

International Preliminary Report on Patentability Issued for PCT/US2018/016711.

* cited by examiner

LIGHT RING ASSEMBLY AND METHOD OF USING THE SAME

This application claims the benefit of U.S. Provisional Patent Application No. 62/453,597 filed Feb. 2, 2017, the entire contents of which are hereby incorporated by reference.

FIELD

This invention generally relates to an illumination device and, more particularly, to an illumination device in the form of a light ring assembly that may be used on a vehicle.

BACKGROUND

Conventional light rings and other illumination devices sometimes struggle to both provide ample amounts of light, yet still appear uniform or homogenized in terms of light distribution. This challenge can be particularly acute with illumination devices that are intended to be used in areas of substantial ambient light, such as external vehicle applications where illumination devices should put out enough light so that they are easily seen in broad daylight. If the illumination devices do not produce enough light for such applications, the light they emit can appear faint or even washed out. On the other hand, illumination devices may produce enough light for such applications, but if proper steps are not taken, the individual lighting elements of such devices can appear discrete or separate from one another, thereby creating dark spots in between.

Accordingly, it is desirable to provide an illumination device that provides enough light to be used in a variety of lighting conditions, yet still presents a relatively uniform or homogenized light distribution.

SUMMARY

According to one aspect, there is provided a light ring assembly, comprising: a circuit board having a plurality of light sources; a light ring made of an optical material facing the plurality of light sources and having a bottom side with an optical input surface, a top side with an optical output surface, an inner periphery, an outer periphery, and a plurality of optical elements; and a lens made of an optical material facing the light ring. The light ring assembly may be arranged so that light from the plurality of light sources enters the light ring at the optical input surface of the bottom side, is reflected and mixed within the light ring by the plurality of optical elements, and exits the light ring at the optical output surface of the top side According to another aspect, there is provided a method of operating a light ring assembly, the light ring assembly includes a circuit board having a plurality of light sources, a light ring having a bottom side with an optical input surface, a top side with an optical output surface, a plurality of optical elements and a central axis. The method may comprise the steps of: emitting light from the plurality of light sources in a generally axial direction; receiving the emitted light at the optical input surface on the bottom side of the light ring; reflecting the received light with a first optical element, the light is reflected by the first optical element in a generally radial direction so that the light substantially remains within the light ring; and reflecting the reflected light with a second optical element, the light is reflected by the second optical element in a generally axial direction so that the light substantially exits the light ring.

DRAWINGS

Preferred exemplary embodiments will hereinafter be described in conjunction with the appended drawings, wherein like designations denote like elements, and wherein.

EMBODIMENTS

A light ring assembly is described herein that is designed to provide bright, uniform and homogenized illumination and can be used with any number of vehicle and non-vehicle lighting applications. Some non-limiting examples of potential lighting applications for the present light ring assembly include external vehicle applications, such as the case of FIG. 1 which shows a light ring assembly surrounding an electric vehicle charging port, and internal vehicle applications, like in FIG. 2 where a light ring assembly surrounds a gauge on a vehicle instrument panel (IP). Many other applications also exist including, but not limited to, those where a light ring assembly surrounds an exterior vehicle component such as a vehicle head lamp, tail lamp and/or brake lamp assembly; where the light ring assembly partially or completely surrounds an interior vehicle component like a key hole, ignition lock cylinder, keyless ignition button, cup holder and/or any other type of suitable external or internal component in need of illumination; and where the light ring assembly follows the perimeter of an interior vehicle component such as an instrument gauge like a speedometer, tachometer, charge status indicator, fuel gauge, switch, button, control, etc.

Figure 1:
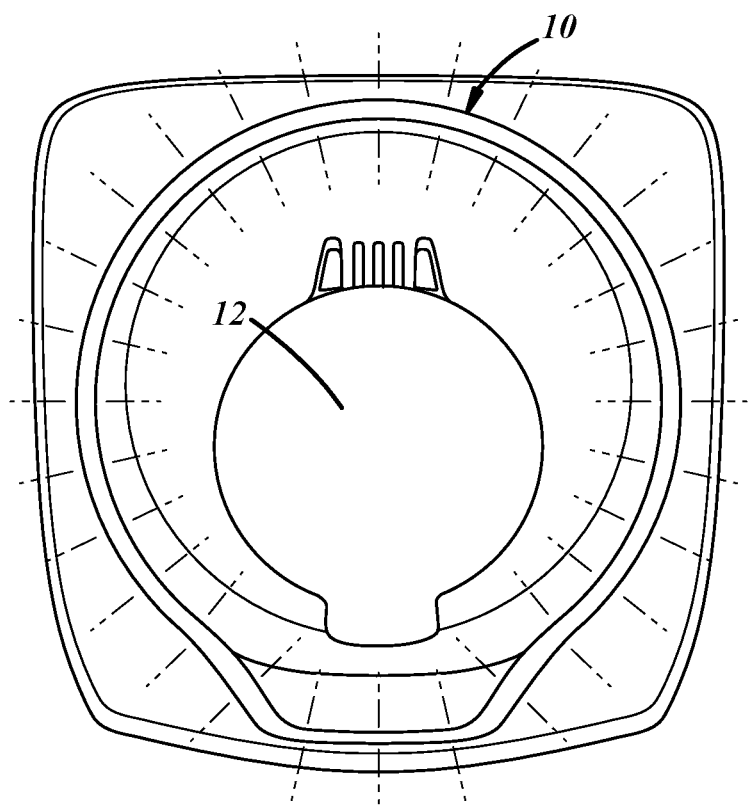
FIG. 1 illustrates an example of a light ring assembly being used in an external vehicle application, in this case the light ring assembly surrounds an electric vehicle charging port.
Figure 2:
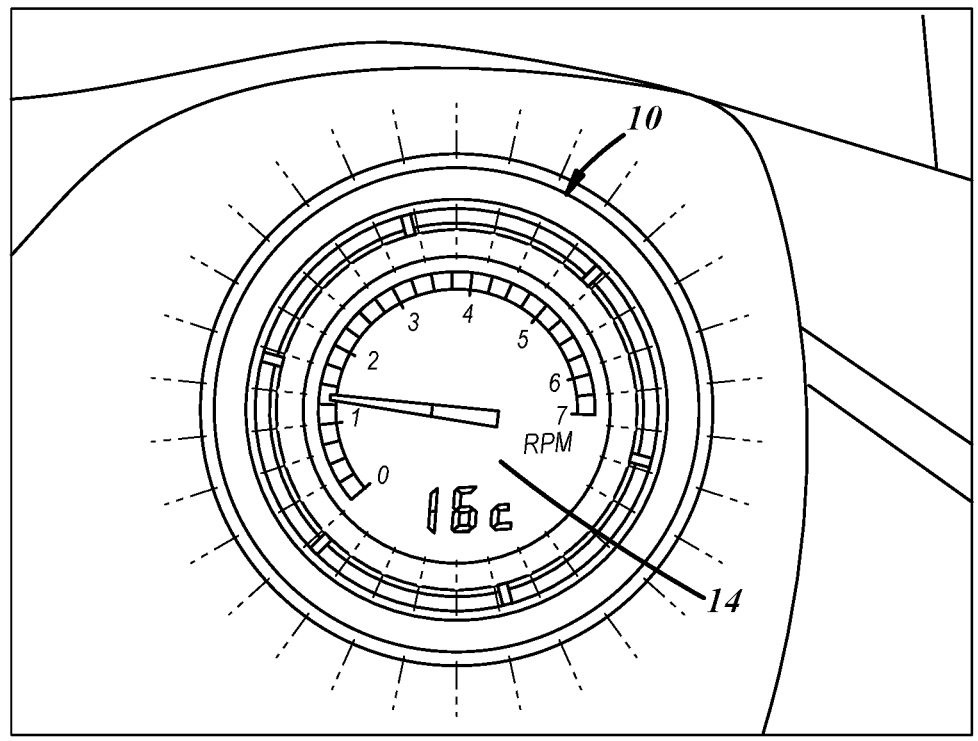
FIG. 2 illustrates an example of a light ring assembly being used in an internal vehicle application, in this case the light ring assembly surrounds a gauge on a vehicle instrument panel (IP)

Turning now to FIGS. 1 and 2, there are several non-limiting examples of light ring assemblies that are designed to address the challenges mentioned above. FIG. 1 illustrates an example of a light ring assembly 10 surrounding an electric vehicle charging port 12 that is located on the outside of a vehicle (an exterior vehicle component) and is hinged to provide access to the actual electrical charging outlet or connection. FIG. 2, on the other hand, shows an example of the light ring assembly 10 surrounding a tachometer 14 that is part of a vehicle instrument panel (IP) (an interior vehicle component). As mentioned above, the light ring assembly described herein is not limited to these applications and may be used with many other applications instead. In each of these applications, the light ring assembly 10 is designed to give off enough light so that it is readily visible in its intended environment, yet still appears as a relatively uniformly lit ring surrounding a certain component.

Figure 3A:
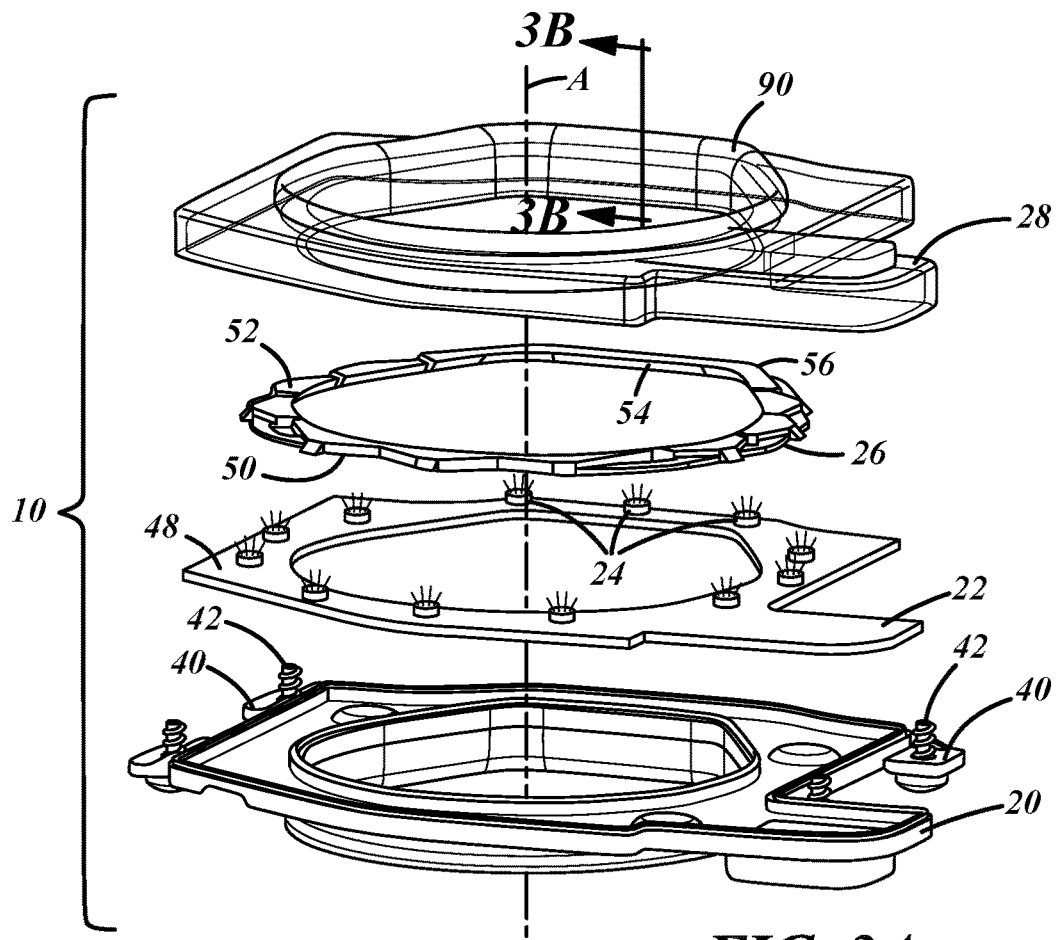
FIGS. 3A and 3B are exploded isometric and sectional views, respectively, of an embodiment of the light ring assembly, where the light ring assembly includes a housing, a circuit board with a number of light sources, a light ring, and a lens.
Figure 3B:
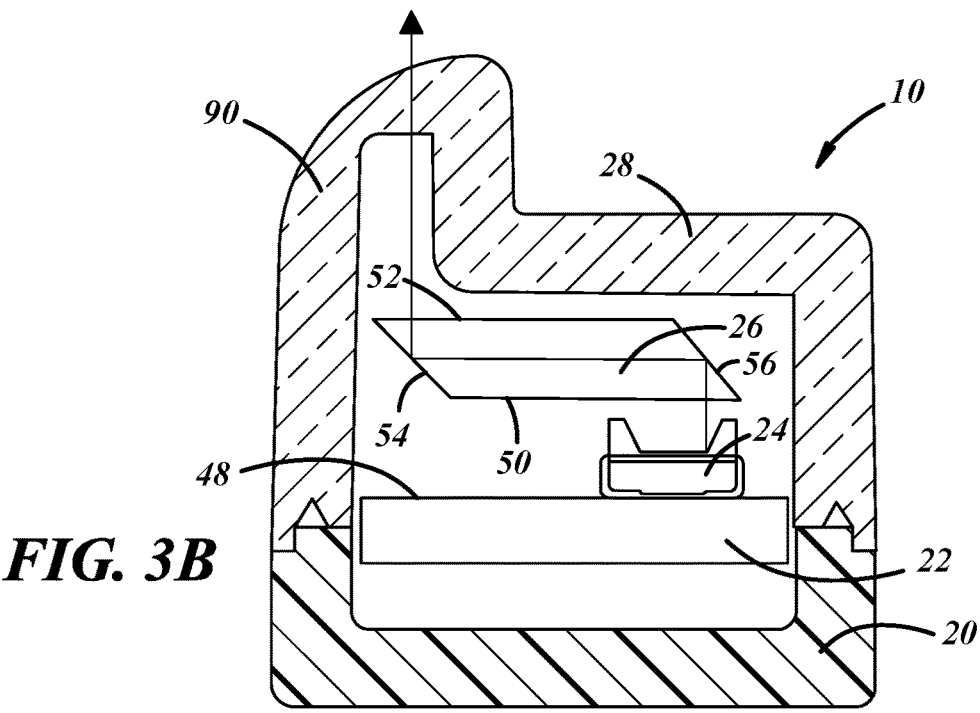

With reference to FIGS. 3A and 3B, there is shown a potential embodiment of the light ring assembly 10, which includes a housing 20, a circuit board 22 with a number of individual light sources 24, a light ring 26, and a lens 28. Although the light ring described in the following paragraphs is generally annular in shape, this is not necessary. The light ring assembly 10 and/or the light ring 26 may instead be oval, triangular, square, rectangular, polygonal, or any other simple or compound shape and is not limited to any particular configuration. The light ring 26 does not need to be continuous where its ends connect with themselves, as is the case with a circle, but instead could be arcuate or curved with unconnected ends (e.g., U-shaped or horseshoe-shaped). Any references used herein to axial, radial and/or circumferential directions are made in reference to the central axis A of the light ring assembly 10. Furthermore, any references used herein to top, bottom, upper, lower and/or other variants thereof, are simply made for purposes of relating different components of the light ring assembly to one another and do not necessarily refer to the orientation of the light ring assembly once it is installed in a particular application. To illustrate, if a device has all of the elements recited in one of the present claims before it is installed in a vehicle, it would still include all of the elements of that claim even if it is installed upside down in a vehicle roof or headliner so that it emits light downwardly instead of upwardly, for example. The fact that the device is ultimately installed upside down would not change the fact that the device still includes all of the elements recited in that claim (including elements such as top and bottom sides).

Housing 20 may be a rigid casing that acts as a base unit or foundation for the assembly 10 and can be made from any hard plastic (e.g., acrylonitrile butadiene styrene (ABS) or polycarbonate), metal and/or other suitable material. As shown in FIG. 3A, the housing 20 can include a series of mounting features, such as bosses 40 for receiving mounting screws 42, that enable the housing to be securely fastened or attached in its intended environment. In the example of an electric vehicle charging port where a charging cord or coupling is to be plugged in, the housing 20 may be fastened to an exterior surface of the vehicle at a location surrounding the charging port, or it may be installed on the exterior of the vehicle in a cavity or well located behind a hinged charging port cover, to cite two examples. In any event, the housing 20 may include any combination of suitable housing components, like gaskets, seals and other items for keeping moisture and contaminants out of the assembly.

Circuit board 22 may include any suitable combination of electronic components and elements needed to control or operate the light ring assembly 10. According to the embodiment shown here, the circuit board 22 is a printed circuit board (PCB) that includes various digital and/or analog circuit components, as well as a series of light sources 24 in the form of light emitting diodes (LEDs) mounted to a top side 48 of the PCB. Of course other electronic circuit implementations, such as flex circuits and the like, could be used instead of PCBs, as the present light ring assembly 10 is not so limited. The light sources 24 illustrated in FIGS. 3A and 3B are top firing LEDs, which emit light upwards and away from a top surface of the diode and are generally easier and/or less costly to implement than corresponding side firing LEDs. However, with some modification to the light ring 26 and possibly some of the other components of the light ring assembly 10, side firing LEDs could be used instead. As best seen in FIG. 3A, a group of top firing light emitting diodes (LEDs) 24 can be configured in an annular arrangement that surrounds an opening in the circuit board 22. It should be appreciated that any suitable type, size and/or color light source may be used, as such a selection is typically driven by the intended application. For instance, an exterior light ring assembly that surrounds an electric vehicle charging port may include green LEDs, while an interior light ring assembly that surrounds a gauge on a vehicle instrument panel may include blue LEDs, whereas other applications may call for white or monochromatic appearing LEDs. Other components, like microprocessors, heat sinks, etc. may also be included on the circuit board 22.

Figure 4B:
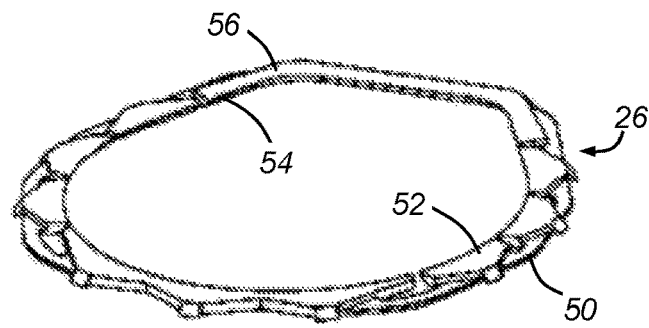
FIGS. 4A, 4B and 4C are top, isometric and side views, respectively, of the light ring shown in FIGS. 3A and 3B.
Figure 4A:
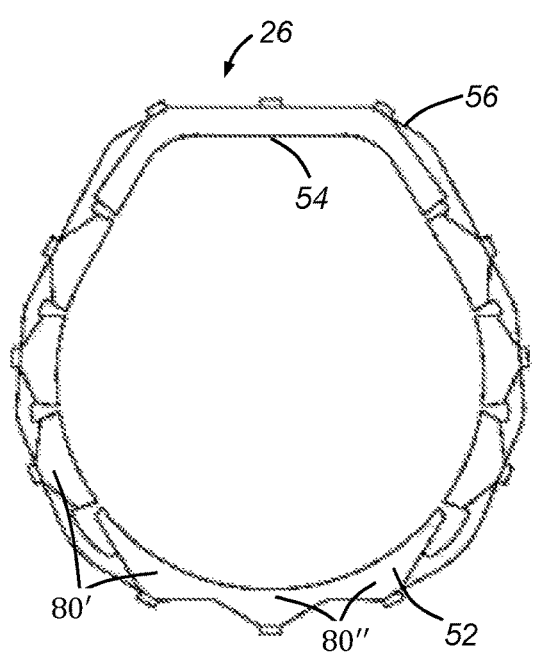
Figure 4C:
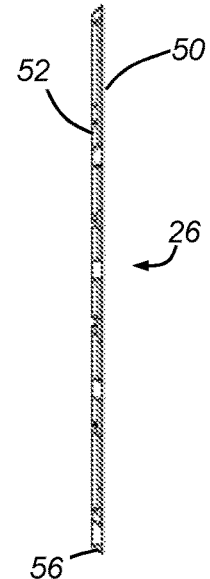

Light ring 26 is designed to receive light from the various light sources 24 and to distribute and/or mix that light within the light ring so that it illuminates in a more uniform or homogenized fashion. Instead of conveying light from the light sources 24 directly to the lens 28, as is the case with some conventional devices, light ring 26 may include a number of optical elements that indirectly convey and/or mix the light, such as in the radial direction of the light ring assembly 10. This arrangement can cause the light ring 26 to act somewhat like a periscope in that it increases the path length or distance the light travels within the light ring, which in turn can have the effect of making the light appear more evenly distributed and minimizing the appearance of discrete dark and/or bright spots. According to one possibility, the light ring 26 is made of any suitable optical material (e.g., poly(methyl methacrylate) or PMMA, polycarbonate, etc.) that may or may not be combined with a translucent material, and can include any number of optical elements such as prisms, wedges, facets, flutes, notches, reflective surface coatings, etc. The term "optical material," as used herein, broadly includes any material that is at least somewhat transparent and/or translucent and that is suitable for optical components and applications, like those disclosed herein. Turning now to FIGS. 4A-4C, there are shown several different perspectives of an embodiment of the light ring 26 that includes a bottom side 50, a top side 52, an inner periphery 54, and an outer periphery 56.

Figure 5:
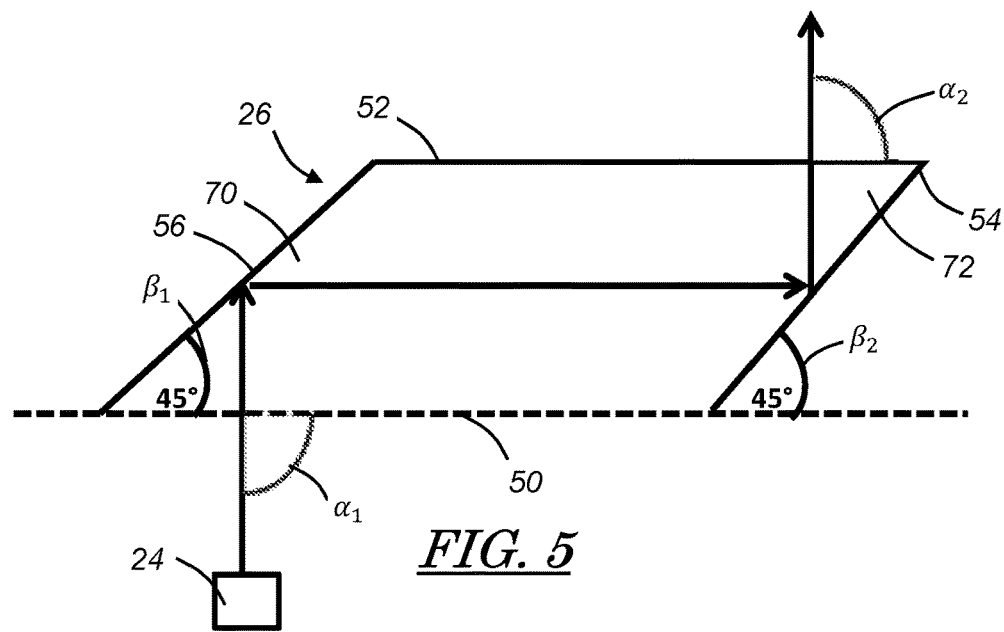
FIG. 5 is a schematic sectional view illustrating the general operation of the light ring shown in FIGS. 3A and 3B.

Bottom side 50 may act as an optical input surface for the light ring 26 and can form a part of one or more optical elements, like prisms or wedges. According to this particular embodiment, which is schematically illustrated in FIG. 5, light from the top firing LEDs 24 impinges or strikes the bottom side 50 and then enters the body of the light ring 26 with little to no refraction (this is because the entrance angle $\alpha 1$ is shown as being approximately equal to 90°; the further away angle $\alpha 1$ is from 90°, the more refraction will occur within the body of the light ring). Once inside the body of the light ring 26, the light strikes first and second optical features 70, 72 according to angles $\beta 1$ and $\beta 2$ and totally internally reflects within the body of the light ring. Skilled artisans will appreciate that angles $\beta 1$ and $\beta 2$ should be selected in accordance with the critical angle of Snell's Law to promote total internal reflection (TIR) within the body of the light ring. According to one example, angles $\beta 1$ and $\beta 2$ are approximately 40° to 55°, inclusive, preferably about 45° to 50°, inclusive, to provide for TIR. Of course, these angles are only examples, as the actual angles of the various optical features will be tuned or customized for their specific implementation. After reflecting off of optical feature 72, the light exits the top side 52 of the light ring 26; again, this may occur with little to no refraction if the exit angle $\alpha 2$ is approximately 90°.

Top side 52 may act as an optical output surface for the light ring 26, in much the same way that the bottom side is an optical input. The top side 52 may somewhat resemble a serrated surface with a jagged or undulating outer periphery 56 such that a series of individual optical elements 70, 72 are defined, but this is not necessary. As best illustrated in FIG. 5, the bottom side 50 and outer periphery 56 together help form optical element 70, which is generally in the shape of prism and acts as an optical input; whereas, top side 52 and inner periphery 54 together help form optical element 72, which is also shaped as a prism and acts as an optical output of the light ring. It is possible for this arrangement to be reversed, however, so that the outer periphery 56 and the top side 52 work together as part of an optical output and inner periphery 54 and the bottom side 50 function as an optical input; some modification may be needed.

Inner periphery 54 may be circular, oval, oblong, parabolic, smooth, undulated and/or some other suitable shape. As explained above, the inner periphery 54 may form part of the prism 72 that reflects light out of the light ring 26 and towards the lens 28. For this reason, when viewed in cross section, the inner periphery may not be a straight up and down surface that is parallel to a central axis A of the light ring assembly 10. Instead, the inner periphery 54 may include a tilted or angled surface that spans the thickness of the light ring between the top and bottom sides 52, 50. FIG. 5 schematically shows the inner periphery 54 being aligned according to an exit angle $\beta 2$, but other angles could be used instead. It should be appreciated that other optical features (e.g., reflective coatings, surface features, curved surfaces, optics, etc.) may be added to the inner periphery 54, the outer periphery 56, or both to influence the reflection and/or refraction of light. In one possible embodiment, the outer periphery 56 may include convex or concave surfaces designed to improve light collection within the body of the light ring 26, whereas inner periphery 54 may include convex or concave surfaces designed to better direct or distribute the light as it exits the light ring.

Outer periphery 56 may have any of the shapes and/or features listed above in connection with the inner periphery 54 and, according to one example, forms part of the prism 70 along with the bottom side 50. In the illustrated embodiment, the outer periphery 56 is an outer circumferential side with a tilted surface that is angled, with respect to central axis A, according to entrance angle $\beta 1$. Like the inner periphery, the outer periphery 56 extends from the top side 52 to the bottom side 50 so that it spans the thickness of the light ring 26. In addition, the outer periphery 56 shown in the drawings is scalloped or undulated so that individual light ring segments 80 are formed, where each light ring segment may be designed to sit over top of and receive light from a corresponding LED 24. In some areas of the light ring 26, such as between segments 80', the outer periphery 56 is broken or discontinuous so that the segments are separated from one another, whereas in other areas like between segments 80", the outer periphery is continuous so that the light ring segments are contiguous and connect with one another.

If the light ring assembly 10 is being used as a charging status indicator, for example, it may be desirable to have separate or demarcated light ring segments 80, where each segment corresponds to an individual LED whose illumination indicates a certain charge level. If, on the hand, the light ring assembly 10 is being used as a singular illumination device (i.e., to appear as a single illuminated component and not a collection of separately illuminated segments within a component), then it may be desirable to change the outer periphery 56 so that it is generally smooth and lacks the undulations that form the individual light ring segments 80. Any number of suitable configurations may be used, as the embodiment shown in the drawings represents just one possibility.

Lens 28 may include a diffuser ring or any other appropriate optics to help present a uniform, homogenous illumination to the user. As illustrated best in FIGS. 3A and 3B, the lens 28 with a diffuser 90 sits overtop of the light ring 26 so that light exiting the top side 52 of the light ring must still pass through the diffuser. In this particular example, the diffuser 90 has a protruding lip or circumferential edge that sticks up further than the rest of the lens 28. The diffuser may be tinted to influence the color of the light ring, as seen by the user, or it can have any number of different lenses and/or other optical features. The lens 28 may also cover, enclose and/or seal the components of the light ring assembly 10 and is designed to be secured to the housing 20. Other implementations are possible including those without a protruding lip. The lens 28 may be manufactured using any suitable optical material (e.g., transparent materials like acrylics).

According to another embodiment that is not illustrated in the drawings, instead of the light ring 26 being configured such that the bottom side 50 and the outer periphery 56 come together in a triangular point at prism 70 (as shown in FIG. 5), it is possible for the outer periphery 56 to extend straight downward (e.g., as an annular skirt or other feature with sides that are parallel to the central axis A) so as to have a flat edge along the side of the light ring 26 that captures more light in the system. Other such changes, including altering the respective angles and/or orientations of the light sources 24, features of the light ring 26 and/or the lens 28, with respect to one another, are certainly possible.

During installation on a vehicle, the light ring assembly 10 may be secured within some type of opening, such as one for a vehicle charging port 12, and electrically connected so that it receives power and/or control signals via a wiring harness or some other type of electrical connector (not shown). The entire light ring assembly 10 may be pre-assembled and then installed as a single unit or module or, in the alternative, components of the light ring assembly may be installed separately.

Figure 6A:
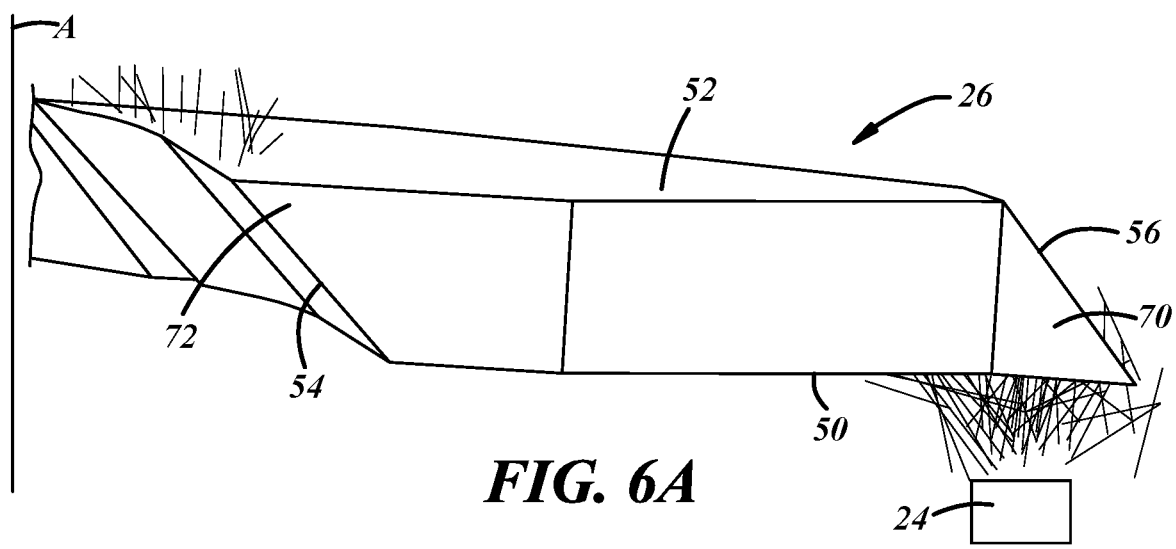
FIGS. 6A, 6B and 6C are sectional views illustrating the general operation of the light ring shown in FIGS. 3A and 3B, where the operation of the light ring is modeled with the use of computer generated light rays.
Figure 6B:
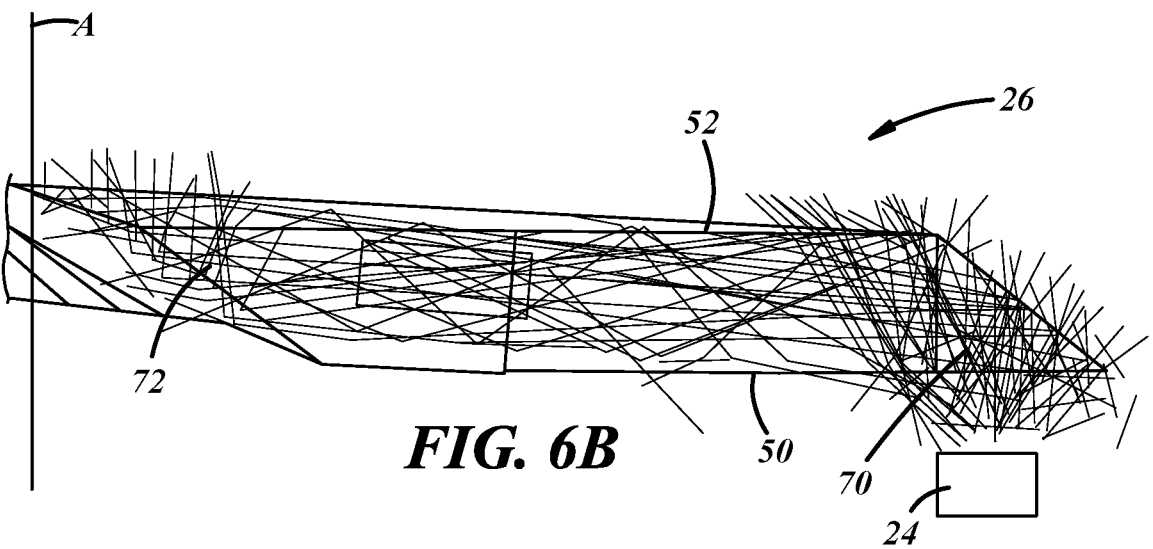
Figure 6C:
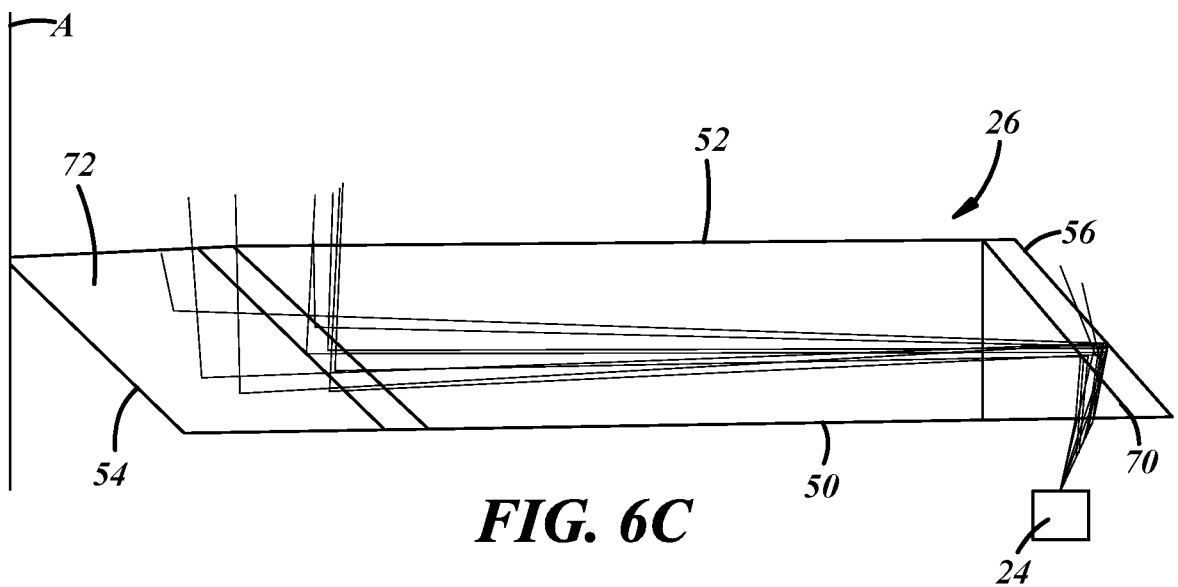

During operation, when the circuit board 22 is powered, the light sources 24 are fired, and light from the light sources is mixed within the light ring 26 so that a generally uniform and homogenized illumination is given off by the light ring assembly 10. This operation is illustrated or modeled in FIGS. 6A-C (which show a side or cross-sectional view of the light ring 26). Light is generally emitted from the various light sources 24 in an axial direction and enters the light ring 26 at an optical input surface that is part of the bottom side 50. Once the light is inside the light ring, it reflects off of a first prism 70 in a generally radial manner (it should be appreciated that it is not necessary that every ray of light follow the described path, as some light may refract out of and escape from prisms 70, 72, yet still be covered by the present application). As the reflected light travels or propagates within the body of the light ring 26, it mixes along the radial width of the light ring (i.e., in a radial direction that is generally perpendicular to the central axis A, between the outer periphery 56 and the inner periphery 54) to become more distributed and spread out as it leaves the light ring. This is why the concentration of light rays in FIG. 6C is so much greater where they enter the light ring (the optical input surface on the bottom side 50) than where they exit the light ring (the optical output surface on the top side 52). The increased path length or distance traveled by the light between prisms 70 and 72 (i.e., the "periscope effect") gives the light more opportunity to spread out and become distributed than if the light directly traveled from the light source 24 to the lens 28. This is particularly true for some full-color LEDs (red, blue, green).

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A light ring assembly, comprising:
    a circuit board having a plurality of light sources;
    a light ring being a flat ring-shaped component made of an optical material and facing the plurality of light sources and having a bottom side with an optical input surface, a top side with an optical output surface, an inner periphery, an outer periphery, and a plurality of optical elements; and
    a lens made of an optical material facing the top side of the light ring, wherein the light ring assembly is arranged so that light from the plurality of light sources enters the light ring at the optical input surface of the bottom side, is reflected and mixed within the light ring by the plurality of optical elements, and exits the light ring at the optical output surface of the top side so that it is directed towards the lens.

2. The light ring assembly of claim 1, further comprising:
    a housing made of a rigid material, the housing is attached to the lens such that the circuit board and the light ring are located therebetween and are protected from an outside environment.

3. The light ring assembly of claim 1, wherein the circuit board includes a top side and the plurality of light sources include a plurality of top firing light emitting diodes (LEDs), the top firing LEDs are mounted on the top side of the circuit board and emit light towards a bottom side of the light ring.

4. The light ring assembly of claim 3, wherein the plurality of top firing light emitting diodes (LEDs) are configured in an annular arrangement that surrounds an annular opening in the circuit board.

5. The light ring assembly of claim 1, wherein the plurality of optical elements of the light ring are configured in an annular arrangement that surrounds an annular opening in the light ring.

6. The light ring assembly of claim 1, wherein the inner periphery of the light ring includes one or more angled surfaces, and the outer periphery of the light ring includes one or more angled surfaces.

7. The light ring assembly of claim 6, wherein the plurality of optical elements of the light ring include a first prism formed by the bottom side and a first angled surface of one of the inner periphery or the outer periphery, and a second prism formed by the top side and a second angled surface of the other of the inner periphery or the outer periphery; and
    wherein the first prism receives light from one of the plurality of light sources and reflects light within the light ring towards the second prism, and the second prism receives light from the first prism and reflects light out of the light ring towards the lens.

8. The light ring assembly of claim 7, wherein the first angled surface of the first prism has an entrance angle $\beta 1$ that is between approximately 40° and 55°, the second angled surface of the second prism has an exit angle $\beta 2$ that is between approximately 40° and 55°, and the first and second prisms are arranged so as to promote total internal reflection (TIR) within the light ring.

9. The light ring assembly of claim 7, wherein the first and second prisms of the light ring are arranged like a periscope so as to increase a path length that light travels within the light ring, thereby mixing the light within the light ring and making illumination from the light ring assembly appear substantially uniform.

10. The light ring assembly of claim 1, wherein at least one of the outer periphery or the inner periphery of the light ring is scalloped or undulated so that a plurality of individual light ring segments are formed.

11. The light ring assembly of claim 10, wherein each of the plurality of individual light ring segments is located over top of and receives light from a corresponding one of the plurality of light sources.

12. The light ring assembly of claim 10, wherein at least one of the outer periphery or the inner periphery of the light ring includes a segment that is broken or discontinuous so that individual light ring segments that are adjacent to one another are separated.

13. The light ring assembly of claim 10, wherein at least one of the outer periphery or the inner periphery of the light ring includes a segment that is unbroken or continuous so that individual light ring segments that are adjacent to one another are connected.

14. The light ring assembly of claim 1, wherein the lens includes a diffuser that is located over top of the optical output surface of the light ring so that light exiting the light ring assembly appears more uniform or homogenized.

15. The light ring assembly of claim 1, wherein the light ring assembly is mounted on an exterior of a vehicle and at least partially surrounds an exterior vehicle component.

16. The light ring assembly of claim 1, wherein the light ring assembly is mounted on an interior of a vehicle and at least partially surrounds an interior vehicle component.

17. A method of operating a light ring assembly, the light ring assembly includes a circuit board having a plurality of light sources, a light ring being a flat ring-shaped component and having a bottom side with an optical input surface, a top side with an optical output surface, a plurality of optical elements and a central axis, and a lens made of an optical material facing the top side of the light ring, the method comprises the steps of:
    emitting light from the plurality of light sources in a generally axial direction;

receiving the emitted light at the optical input surface on the bottom side of the light ring;

reflecting the received light with a first optical element, the light is reflected by the first optical element in a generally radial direction so that the light substantially remains within the light ring; and reflecting the reflected light with a second optical element, the light is reflected by the second optical element in a generally axial direction so that the light substantially exits the light ring at the optical output surface on the top side of the light ring and is directed towards the lens.

* * * * *